US 6,721,844 B1

(12) United States Patent
Okutsu et al.

(10) Patent No.: US 6,721,844 B1
(45) Date of Patent: Apr. 13, 2004

(54) DATA STORAGE UNIT AND METHOD FOR STARTING DATA STORAGE UNIT

(75) Inventors: Kazushige Okutsu, Fujisawa (JP); Tetsuo Ueda, Sagamihara (JP); Yukio Fukushima, Tokyo-to (JP); Toshio Kakihara, Fujisawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/114,584

(22) Filed: Jul. 13, 1998

(30) Foreign Application Priority Data

Jul. 14, 1997 (JP) .............................................. 9-187900

(51) Int. Cl.[7] .............................................. G06F 12/00
(52) U.S. Cl. ...................................... 711/112; 711/167
(58) Field of Search ................................ 711/167, 112; 360/69, 70, 71, 75, 72.1, 78

(56) References Cited

U.S. PATENT DOCUMENTS

| | | | |
|---|---|---|---|
| 4,589,036 A | * | 5/1986 | Bertschy et al. ............... 360/75 |
| 4,697,127 A | | 9/1987 | Stich et al. .................. 318/561 |
| 5,065,262 A | * | 11/1991 | Blackborow et al. .......... 360/75 |
| 5,299,075 A | * | 3/1994 | Hanks ....................... 360/77.02 |
| 5,377,058 A | * | 12/1994 | Good et al. ..................... 360/75 |
| 5,914,829 A | | 6/1999 | Kadlec et al. ............. 360/78.04 |
| 5,914,830 A | | 6/1999 | Kadlec et al. ............. 360/78.14 |
| 5,926,340 A | | 7/1999 | Sim ......................... 360/78.09 |

* cited by examiner

Primary Examiner—Matthew Kim
Assistant Examiner—Matthew Anderson
(74) Attorney, Agent, or Firm—Robert B. Martin

(57) ABSTRACT

To provide a method of starting a data storage unit which allows a computer system to be used as early as possible. The present invention relates to a method for starting up a computer system having a data storage unit equipped with an actuator arm which supports a flexible cable. The method allows a command from the host computer to be processed before generation of corrected tension data for the flexible cable. The method includes the steps of turning on power; executing a start operation, excluding generation of corrected tension data of the flexible cable; causing an access command from a host computer to be in an executable state, following the step of executing a start operation; and executing generation of corrected tension data of the flexible cable, following the step of causing an access command from a host computer to be in an executable state.

6 Claims, 6 Drawing Sheets

| Zones | Cylinder groups | Flexible cable tensions |
|---|---|---|
| $Z_1$ | C(0) ... C(219) | TENSION 1 |
| $Z_2$ | C(220) ... C(439) | TENSION 2 |
| $Z_3$ | C(440) ... C(659) | TENSION 3 |
| ⋮ | ⋮ | ⋮ |
| $Z_{47}$ | C(10120) ... C(10339) | TENSION 47 |

DATA STORAGE UNIT AND METHOD FOR STARTING DATA STORAGE UNIT

BACKGROUND OF THE INVENTION

1. Field of the Invention

The present invention relates to a method for starting an operation of a data storage unit equipped with an actuator arm which supports a flexible cable for data transfer connected between the transducer and the control circuit of the data storage unit. More particularly, the invention relates to a start method which makes it possible to execute early the access tension which a flexible cable gives to an actuator arm.

2. Description of Related Art

In a quest of user friendliness, the computer system in recent years is even further shortening the time needed to use of the computer system after power is turned on. In such environment, magnetic disk drives are used as the secondary data storage unit of the computer system and store an operating system and various application programs which are used in the computer system. Access to the magnetic disk drive has been recognized as a specific problem in shortening the time needed to use a host computer after power is turned on.

FIG. 1 is a plan view of a general magnetic disk drive. The magnetic disk drive 10 is a data storage unit which includes a rotary type magnetic disk 11 with concentric data tracks on which data is stored, a transducer (not shown) for reading or writing data from or to various tracks, a slider 12 with the transducer attached thereto, a suspension arm 13 having the slider 12 attached thereto so that bias force is applied in a direction in which the slider 12 approaches the surface of the magnetic disk 11, an actuator arm 14 and a voice coil motor (VCM) section 15 for locking the suspension arm 13 and for moving the transducer over a desired track position and maintaining it over the longitudinal center line of the track during read and write operations, a flexible cable 16 connected at one end thereof to the transducer and supported by the actuator arm 14, and a board 20 mounted with a control circuit section 17 connected to the other end of the flexible cable 16.

The magnetic disk 11 has a plurality of magnetic disks fastened to a spindle 19 and stacked at predetermined intervals. The magnetic disks 11 are rotated together with the spindle 19 by a spindle motor (not shown). A plurality of actuator sets each consisting of the transducer, the slider 12, the suspension arm 13, and the actuator arm 14 are stacked in correspondence with the respective surfaces of the magnetic disks 11 and constitute an actuator assembly 21. The actuator sets are integrally rotated over magnetic disk surfaces in directions of arrow A with stacked magnetic disks on which data can be read out or written to with the transducer are often called cylinders.

In order to position the transducer over a predetermined cylinder, a predetermined driving torque needs to be generated in the VCM section 15 to move the actuator assembly 21. The driving torque is computed from the relationship between the current cylinder position of the transducer and the cylinder position to which the converter is to be moved. Although the flexible cable 16 is connected to both the transducer supported by the actuator arm 14 and the board 20, it does not interfere with the rotation of the actuator assembly in the directions of arrow A. The flexible cable always gives the actuator assembly 21 tension in a direction of arrow B. Therefore, the driving torque for the actuator assembly 21, which is generated in the VCM section, needs to be set to a value compensating for the tension of the flexible cable 16.

However, the value of the tension of the flexible cable does not only vary with a cylinder position on the magnetic disk 11, but it also varies due to various major factors, such as operating conditions (temperature, humidity, voltage, etc.), elapsed years, and operating time. Therefore, the tension applied to the actuator assembly 21 by the flexible cable 16 needs to be successively corrected. In current magnetic disk drives, tension data is generated each time power is turned on.

Until a magnetic disk drive will be able to accept access from a host computer after power to the magnetic disk drive is turned on, there is always a need to perform a predetermined start operation. FIG. 2 is a flowchart showing a conventional procedure for starting the magnetic disk drive of FIG. 1. In step 50, power to the magnetic disk drive is turned on. Then, in step 51, an internal diagnostic program is executed to confirm whether there is anything abnormal in the function of the magnetic disk drive. After it has been confirmed that there is nothing abnormal in step 51, it is confirmed in step 52 that the spindle motor has been rotated and has reached a predetermined rotational speed. Next, in step 53, microcode which is stored on the magnetic disk for controlling the magnetic disk drive is read out to a memory. After the procedure in step 53 has ended, the actuator assembly is positioned over each cylinder to correct the tension data of the flexible cable (hereinafter referred to as tension data). Then the corrected tension data is stored on memory to form a table (step 54). After the procedure has been completed (step 54), the computer is at last able to have access to the magnetic disk drive to read out or write data (step 55). In a typical example of 3.5-inch magnetic disk drives, the start preparation from step 51 to step 53 takes 8 seconds and the generation of corrected tension data in step 54 takes 2 seconds, so that the host computer cannot have access to the magnetic disk drive for 10 seconds after power is turned on.

The object of the present invention is to provide a method of early use of a data storage unit which allows a computer system to be used as early as possible after turning on power to the computer system, including the data storage unit.

SUMMARY OF THE INVENTION

The principles of the present invention involve the use of the tension data of a flexible cable generated at the time of fabrication (hereinafter referred to as shipping-time tension data), to allow a host computer to have early access to a data storage unit. After power has been turned on, the host computer executes a diagnostic program. In order to complete the start operation early, the host computer requires early access to a data storage unit. On the other hand, during the start sequence of the data storage unit, generation of the corrected tension data of the flexible cable is always needed. However, at the stage immediately after power is turned on, the corrected tension data does not always have to be generated prior to the access of the host computer. Therefore, in the present invention, the start sequence of the data storage unit which must be executed prior to access by the host computer is first executed. After the start sequence has been completed, the host computer is allowed to have access to the data storage unit, and generation of corrected tension data is executed in parallel with the execution of the start sequence of the host computer.

In an embodiment of the present invention, after a start operation excluding generation of corrected tension data has been completed, if there is an access command from a host computer, it will be processed. The start operation excluding generation of corrected tension data is an operation that is always performed before accepting access commands, such as execution of an internal diagnostic program, start of a spindle motor, and reading of microcode to a memory.

In another embodiment of the present invention, previously generated tension data is stored on a non-volatile storage medium and read to memory during a start operation before generation of corrected tension data. When an access command is sent from a host computer before corrected tension data is generated, the torque which is generated in a voice coil motor (VCM) for positioning of a transducer is set by using the previously generated tension data. The previously generated tension data may be tension data generated at the time of shipment or old corrected tension data generated after shipment.

Still another embodiment of the present invention involves the case where the torque of the VCM cannot be appropriately set by previously generated tension data. When a transducer cannot be correctly positioned over a cylinder even after a predetermined time, the tension data is corrected to set a new torque for the VCM, and positioning of the transducer is again executed with the new torque for the VCM.

In a further embodiment of the present invention, following the end of the start operation excluding generation of corrected tension data, it is judged whether or not an unexecuted access command is present among the access commands from a host computer. If an unexecuted access command is present, it will be processed prior to generation of corrected tension data. If it is not present, generation of corrected tension data will continue to be executed. Therefore, generation of corrected tension data can be completed early, while giving priority to an access command from a host computer. The step of judging an unexecuted access command and the step of generating corrected tension data may comprise a plurality of steps.

In an additional embodiment of the present invention, even after the step of generating corrected tension data, the host computer is monitored for an access command. If an access command is present, it will be processed first. Therefore, until corrected tension data is finally generated, an access command from a host computer is executed prior to generation of corrected tension data, and corrected tension data is generated by utilizing a time when there is no access command.

A computer program capable of carrying out the aforementioned embodiments of the present invention is stored on the non-volatile storage medium of a data storage unit, and when power is turned on, the computer program is read out to a random access memory (RAM) as microcode and is then executed.

Other objects, features, and advantages of the present invention will be apparent from the accompanying drawings and from the detailed description below.

BRIEF DESCRIPTION OF THE DRAWINGS

The present invention is illustrated by way of example and in the figures of the accompanying drawings, in which like references indicate similar elements, and in which.

DETAILED DESCRIPTION OF THE INVENTION

Figure 1:
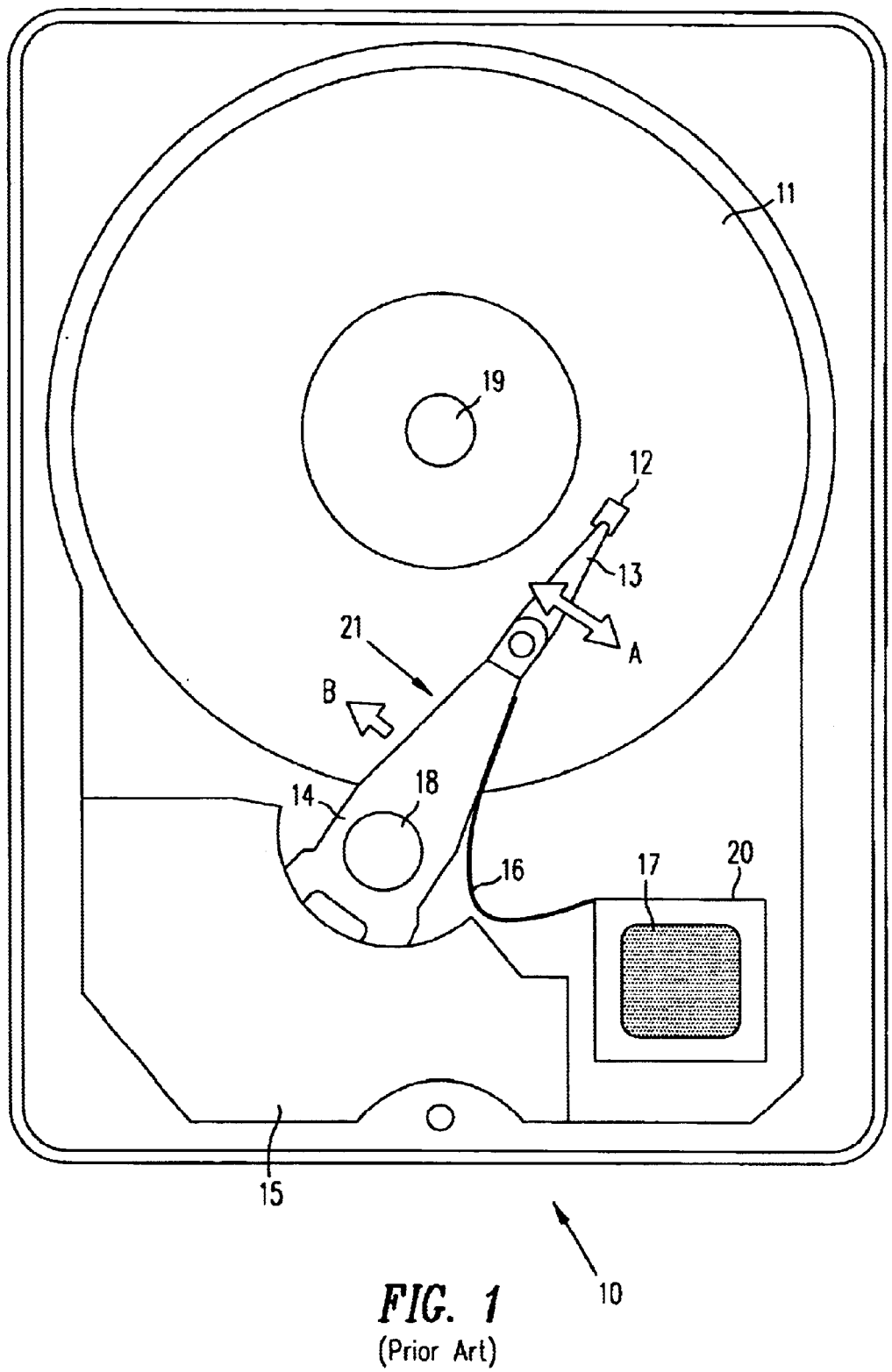
FIG. 1 is a plan view of a general magnetic disk drive.
Figure 3:
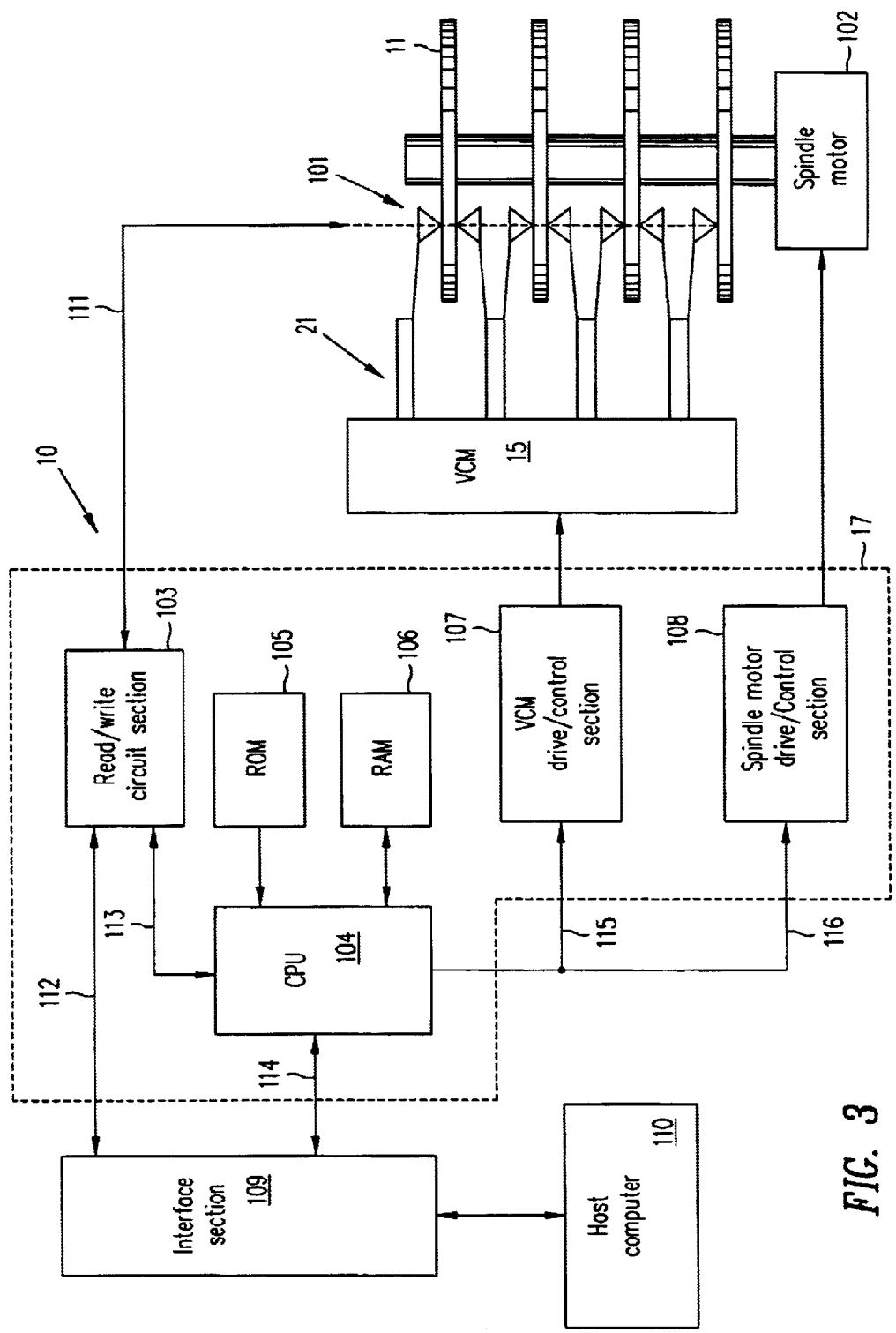
FIG. 3 is a block diagram of a magnetic disk drive for carrying out the present invention.

FIG. 3 is a block diagram of a magnetic disk drive for carrying out the present invention, and the same reference numerals are applied to parts corresponding to FIG. 1. A host computer 110 transmits and receives data and commands between it and a magnetic disk drive 10 through an interface section 109. A transducer 101 reads out data written magnetically to a magnetic disk 11 and sends it onto a line 111 as a current signal. Also, a current signal sent over the line 111 is converted to a magnetic signal, which is written to the magnetic disk 11. The read/write circuit section 103 converts a current signal on the line 111 to a digital signal which can be processed by a computer. The read/write circuit section 103 sends the digital signal to the host computer 110 or a central processing unit (CPU) 104 through a line 112 or 113 and also performs the opposite processing. The CPU 104 performs transmission/reception of commands between it and the host computer 110 through a line 114 and also performs reading and writing of data between it and the magnetic disk 11 through the line 113. A random access memory (RAM) 106 connected to the CPU 104 temporarily stores programs and data which are executed by the CPU 104. A read-only memory (ROM) 105 connected to the CPU 104 stores a diagnostic program needed when an operation of the magnetic disk 10 is started. A VCM drive/control section 107 drives the VCM section in accordance with a command sent from the CPU 104 through the line 115, thereby positioning the transducer 101 of an actuator assembly 21 over a predetermined cylinder. A spindle motor drive/control section 108 maintains a spindle motor 102 at a predetermined rotational speed in accordance with a command sent from the CPU 104 through a line 116.

Figures 2, 4:
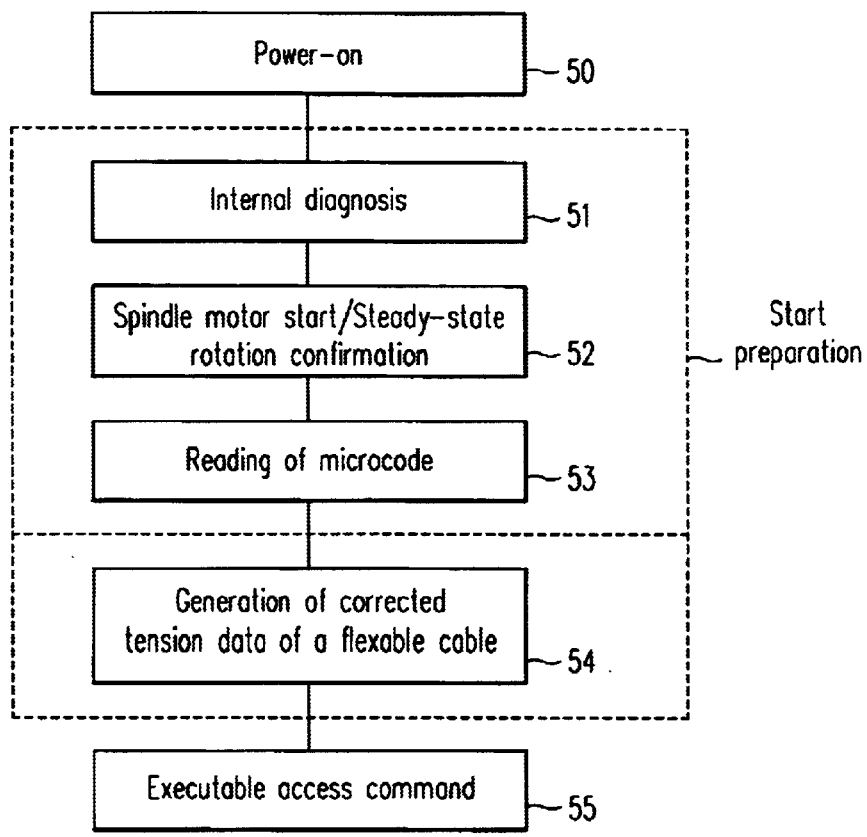
FIG. 2 is a flowchart showing a conventional procedure of starting the magnetic disk drive.
FIG. 4 is a table showing the tension data of the flexible cable.

FIG. 4 is a table showing the data structure of the tension data of the flexible cable. Each magnetic disk 11 has 10400 tracks in the form of concentric circles from the outer side to the inner side, and as previously described, the tracks on the magnetic disks form the same number of cylinders. One zone is defined for each 220 cylinders, and the cylinders are divided into a total of 47 zones. A single value of the tension of the flexible cable is set for each zone. The tension data is preferably obtained for a cylinder with an intermediate number among the cylinders contained in each zone. The shipping-time tension data with the structure of FIG. 4 and the program for carrying out the present invention are stored at a predetermined place of the magnetic disk 11 along with other microcodes.

Figure 5:
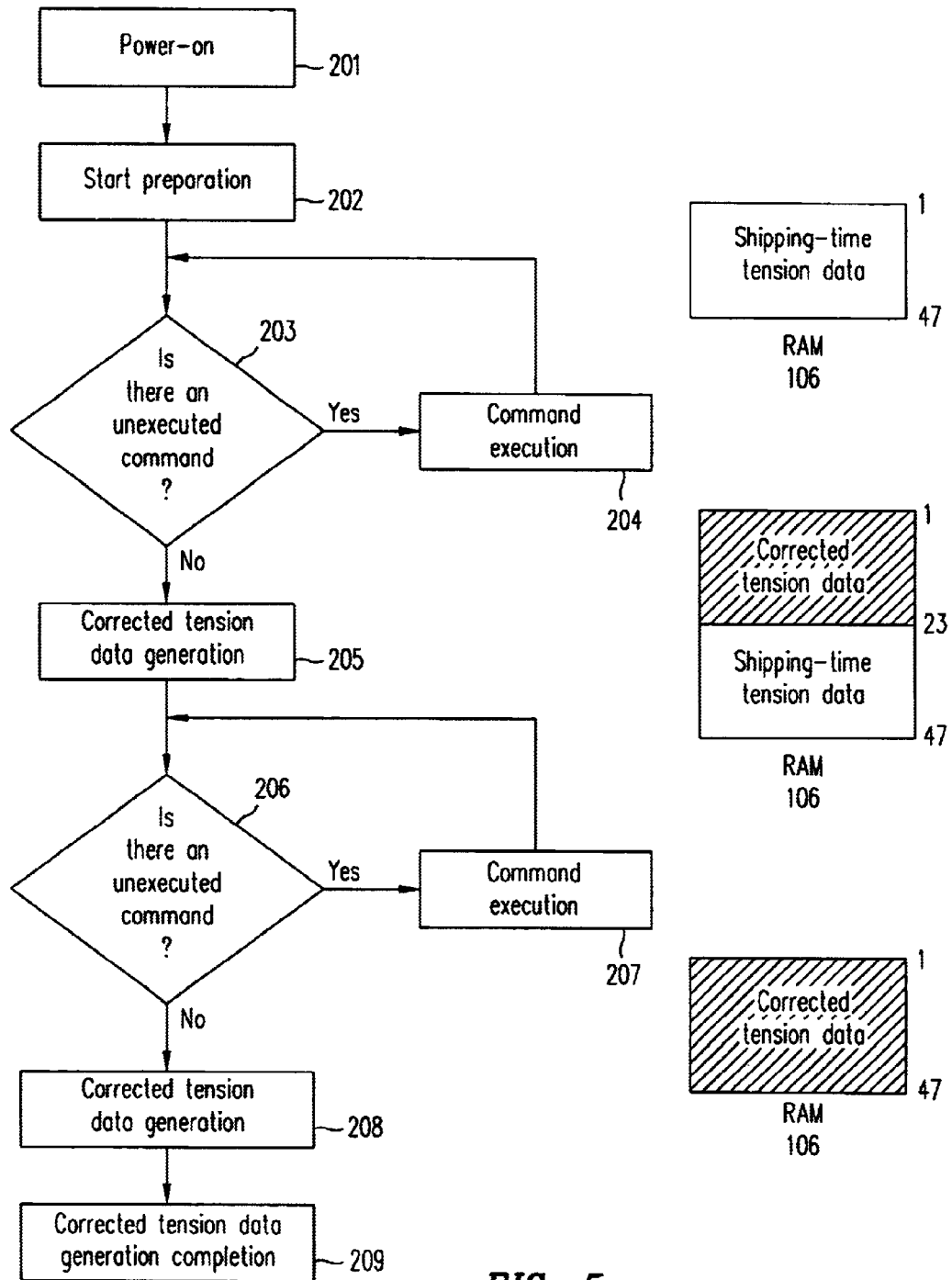
FIG. 5 is a flowchart showing a first embodiment of a start method according to the present invention.

FIG. 5 is a flowchart showing a first embodiment of the start method according to the present invention. The first embodiment of the present invention will be described according to FIGS. 3 through 5. In this embodiment, shipping-time tension data has been written to the magnetic disk. In the flowchart of FIG. 5, step 201 and step 202 include the same start sequence as steps 50 through 53 in the conventional start method shown in FIG. 2. In step 201 power is turned on. Then, in the start preparation of step 202, the CPU executes the internal diagnostic program stored on the ROM. In the case where there is nothing abnormal after the execution of the internal diagnostic program, the CPU rotates the spindle motor up to a predetermined rotational speed through the spindle motor drive/control section and maintains the motor at that speed. Next, the microcode, the program for carrying out this embodiment, and the shipping-time tension data as shown in FIG. 4, stored at a predetermined place of the magnetic disk, are read out to the RAM. The tension data of the flexible cable needed for positioning the transducer of the actuator assembly over the magnetic disk surface for the read operation is generated at the time of shipping and stored in the ROM. The CPU sets torque for the VCM drive/control section by using the tension data of the flexible cable stored on the ROM. After the transducer has been positioned over a predetermined cylinder, the microcode, the execution program for this embodiment, and the shipping-time tension data are read out to the RAM via the lines 111 and 113, thereby completing steps 201 and 202.

Until step 202 is completed, if an access command arrives at the CPU from the host computer, it will be temporarily stored on the RAM, because the magnetic disk drive is not in a state which accepts the access command from the host computer. Where the command cannot be executed even after a predetermined time, the magnetic disk drive sends a response of execution impossibility to the host computer and then ends the processing of the command. However, in this embodiment, if step 202 is completed, the magnetic disk drive will be in a state which accepts an access command from the host computer. In the case where an unexecuted access command remains in the RAM 106 at the time step 202 has been completed, or a command is sent from the host computer to the CPU after completion of step 202, the command processing in the magnetic disk drive is performed as follows.

At the time step 202 has been completed, corrected tension data has not been generated and shipping-time tension data has been stored in the RAM. In this embodiment, during the time from the completion of step 202 to the generation completion of corrected tension data (step 209), shipping-time tension data is used for processing an access command from the host computer. In step 203 it is judged whether or not an unexecuted access command is present in the RAM. If the command is present, step 203 will advance to step 204. In the execution of the command in step 204, the CPU sets the torque that is generated in the VCM, using the shipping-time tension data stored in the RAM, and the transducer is positioned over a cylinder on the magnetic disk in accordance with an address specified by the command. The shipping-time tension data does not always provide an accurate tension of the flexible cable at each point of time, as described above. Therefore, in the case where shipping-time tension data is used, it is predicted that positioning of the transducer will take more time than using corrected tension data, because the torque of the VCM needed for positioning the transducer over a predetermined cylinder has not been set to an optimum value. However, immediately after start of the magnetic disk drive, it is required to enable the access as early as possible for the start of the host computer. Therefore, the use of shipping-time tension data can meet the early-access requirement of the host computer. If shipping-time tension data differs considerably from actual tension, there will be cases where positioning of the transducer cannot be performed within an allowable time. In such cases the following error recovery procedure (ERP) is executed.

The ERP program is read out to the RAM in step 202 as a portion of microcode. When it is judged that the transducer cannot within a predetermined time be positioned over a cylinder with an address indicated by the host computer using the shipping-time tension data, the CPU suitably changes the tension data of the zone containing that cylinder, for example, in a range of +10% to −10%, and positioning of the transducer is executed again. Since the positioning of the transducer using the shipping-time tension data increases the access time in the case where a large quantity of commands are processed, there is a need to generate corrected tension data in the following steps. On the other hand, the host computer, after first accessing the magnetic disk drive, can execute the start sequence thereof in parallel with the generation of corrected tension data for the magnetic disk drive. Therefore, if the magnetic disk drive accepts a command from the host computer at an early time in the start operation, it will be effective because the startup of the entire computer system can be ended early.

In the execution of steps 203 and 204, if it is judged that there is no unexecuted command, step 203 will advance to step 205. In step 205, a table of tension data such as that shown in FIG. 4 is generated in a way similar to conventional. In this embodiment, the generation of corrected tension data is executed twice in steps 205 and 208, and in each step, the corrected tension data is generated for half of the entire numbers of zones. However, the number of data generations is not limited to twice, but it can be set to an optimum number of data generations in relation to a computer system to be used. The generated corrected tension data is stored in sequence in the RAM by overwriting the shipping-time tension data table corresponding to the each zone. Therefore, at the time when step 205 has been completed, shipping-time tension data of the RAM is corrected in the first half zones 1 through 23 and remains unchanged in the second half zones 24 through 47. During execution of step 205, if an access command is sent from the host computer, the CPU will temporarily store that command in the RAM and also compute the elapsed time. Where the command cannot be executed within a predetermined time, the magnetic disk drive sends a response of execution impossibility back to the host computer and erases the command from the RAM.

In steps 206 and 207, as with steps 203 and 204, an unexecuted command is processed. However, at this time, since corrected tension data has been stored for zones 1 through 23 in the RAM, when a cylinder contained in zones 1 through 23 is being accessed, corrected tension data is used. On the other hand, when a cylinder contained in zones 24 through 47 is being accessed, shipping-time tension data is used. In step 208, corrected tension data for the remaining zones is generated, and in step 209 and steps thereafter, corrected tension data is used for access to all cylinders.

In this embodiment of the present invention, when power to the magnetic disk drive is turned off, all the corrected tension data stored in the RAM is erased. When power is again turned on, the procedure shown in FIG. 5 is again executed, thereby generating new corrected tension data. In another embodiment, the corrected tension data is stored in RAM on a magnetic disk; and when power is again turned on, the stored data can be used as alternative data for the shipping-time tension data described in step 202 of the aforementioned embodiment. If alternative data is always updated to new data before power is turned off, it will be possible to use higher precision tension data than shipping-time tension data, in the case where an access command is executed before generation of corrected tension data in step 204.

Figure 6:
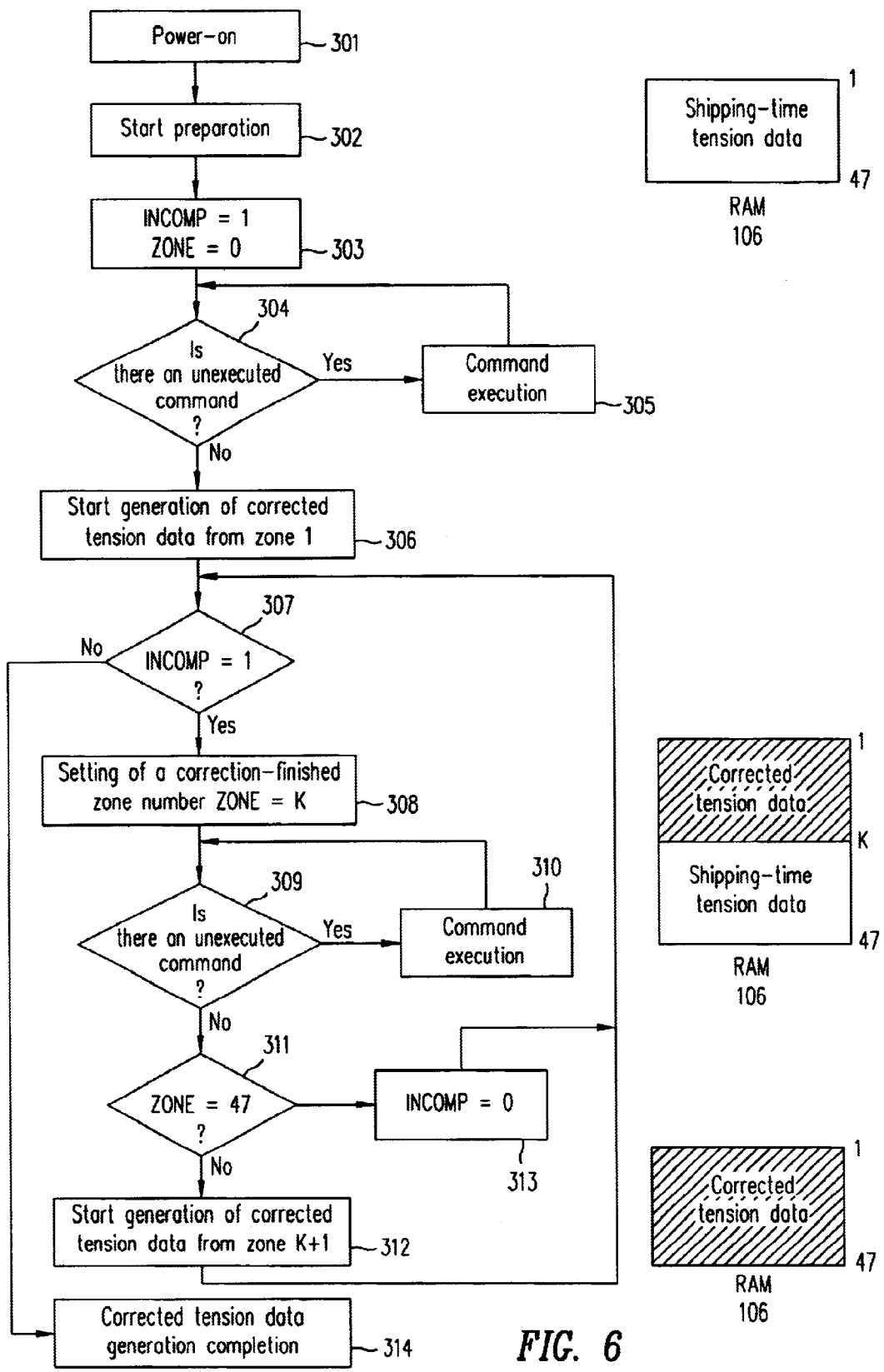
FIG. 6 is a flowchart showing a second embodiment of the start method according to the present invention.

In the first embodiment described in FIG. 5, during the time that corrected tension data is being generated in steps 205 and 208, a magnetic disk drive cannot execute an access command from a host computer. The host computer has to wait during this period; or, consequently, when the time for the command stored in the RAM runs out, the host computer will have to send the command again. As a second embodiment of the present invention, in FIG. 6 there is shown a method of starting a magnetic disk drive where priority is given to processing of a command from a host computer. Steps 301 and 302 are the same as steps 201 and 202 of FIG. 5. In step 303, the RAM is provided with an INCOMP flag, and this flag is set to 1. Assume now that INCOMP=1 represents that generation of corrected tension data has not been completed and INCOMP=0 represents that generation of corrected tension data has been completed. Furthermore, in step 303 the RAM is provided with a counter ZONE representing the number of a zone where generation of corrected tension data has been completed, and the initial value is set to 0.

If step 303 is completed, the magnetic disk drive can execute an access command from the host computer. Steps 304 and 305 are executed in a similar procedure as steps 203 and 204 of FIG. 5. Where there is no unexecuted command in the RAM in step 304, generation of corrected tension data is started from zone 1 in step 306. In step 307, each time the generation of corrected tension data of a single zone is completed, in step 307 the state of the INCOMP flag is confirmed. In the case where INCOMP=1, corrected tension data has not been generated until the last zone, in step 308 the counter ZONE is overwritten to the number of a zone where generation of corrected tension data has ended, for example, to K.

In the same way as that described in the first embodiment, the shipping-time tension data stored in the RAM is overwritten with corrected tension data in sequence and stored in the RAM. During generation of corrected tension data, the CPU monitors whether an access command has been sent from the host computer (step 309). When generation of corrected tension data ends with zone number K, in the case where an unexecuted command is present in the RAM, in step 310 the command is executed and generation of corrected tension data is interrupted in the state of zone K. Therefore, an access command from the host computer is processed prior to generation of corrected tension data. In the execution of the command in step 310, the positioning of the transducer over a desired cylinder uses corrected tension data for the cylinders up to zone number K and shipping-time tension data or the previous corrected tension data for the other cylinders, as in the first embodiment.

If there is no unexecuted command, it is judged whether or not the value K of the counter ZONE is equal to the number 47 of the last zone (step 311). If the value K is not equal to the number 47 of the last zone, in step 307 generation of corrected tension data will be restarted from zone K+1 (step 312), and step 312 will return to step 307. In step 311, when the value K of the counter ZONE is equal to the number 47 of the last zone, the INCOMP flag is set to 0 and step 311 returns to step 307. In step 307, if the flag is judged to be INCOMP=0, step 307 will advance to step 314. In step 314 generation of corrected tension data is entirely completed.

Figure 7:
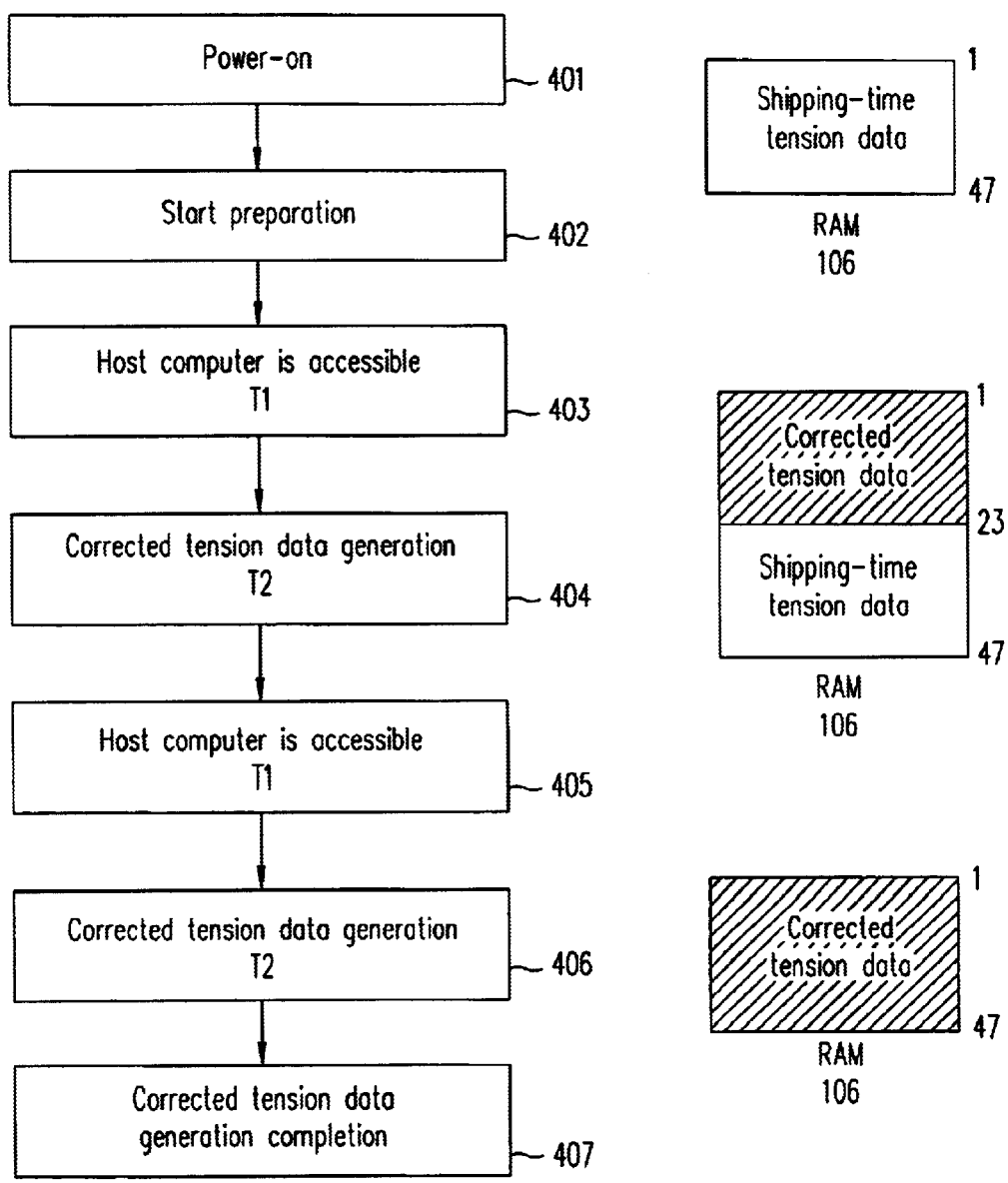
FIG. 7 is a flowchart showing a third embodiment of the start method according to the present invention.

The principles of the present invention are also realizable as a simple method which does not take away judging access command existence, such as that adopted in the first and second embodiments. FIG. 7 is a flowchart showing a third embodiment of the present invention. Steps 401 and 402 are executed in the same way as the first and second embodiments. In step 403 the host computer is allowed to have temporary access to the magnetic disk drive only for a predetermined time T1. After time T1, the CPU executes generation of corrected tension data for a predetermined time T2 regardless of the existence of an unexecuted access command (step 404). During generation of corrected tension data, the execution of an access command is not performed. After time T2, steps 405 and 406 are further executed in the same way as steps 403 and 404. The third embodiment is characterized in that the number of generations of corrected tension data is preset to one time or more, and the host computer is allowed to have temporary access to a magnetic disk drive after completion of start preparation (step 402). The number of generations of corrected tension data, time T1, and time T2 can be properly set in relation to a computer system to be used.

The present invention improves a method of starting a data storage unit which is used in a computer system, so that access of the host computer to the data storage unit can be allowed shortly after power is turned on. If the host computer has access to the data storage unit, it can continue its operation in parallel with the generation of corrected tension data by the data storage unit and therefore utilization of the entire computer system will be more effective.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for starting a magnetic disk drive data storage unit in a computer, the storage unit having an actuator arm which supports a flexible cable, comprising the steps of:

(a) turning on power to the data storage unit;

(b) executing a start operation for the storage unit, comprising (i) executing internal diagnostic program, (ii) rotating the spindle motor and (iii) reading microcode and stored tension data for the flexible cable;

(c) executing any unexecuted access command from the computer; and (d) executing generation of corrected tension data for the flexible cable, following step (c).

2. The method as set forth in claim 1, wherein the step of executing an access command from the computer includes a step of executing the access command using tension data for the flexible cable generated before the power was turned on in step (a).

3. The method as set forth in claim 2, wherein the step of executing an access command from the computer includes a step of correcting the tension data of the flexible cable by a predetermined value during operation of the storage unit.

4. A method for starting a magnetic disk drive data storage unit in a computer, the storage unit having an actuator arm which supports a flexible cable, comprising the steps of:

(a) turning on power to the data storage unit;

(b) executing a start operation for the storage unit, comprising (i) executing internal diagnostic program, (ii) rotating the spindle motor and (iii) reading microcode and stored tension data for the flexible cable;

(c) judging whether an unexecuted access command is present among access commands from the host computer;

(d) executing any unexecuted access command; and (e) executing generation of corrected tension data for the flexible cable following step (d).

5. A method for starting a magnetic disk drive data storage unit in a computer, the storage unit having an actuator arm which supports a flexible cable, comprising the steps of:

(a) turning on power to the data storage unit;
(b) executing a start operation for the storage unit, comprising (i) executing internal diagnostic program, (ii) rotating the spindle motor and (iii) reading microcode and stored tension data for the flexible cable;
(c) judging whether an unexecuted access command is present among access commands from the host computer;
(d) executing any unexecuted access command;
(e) generating a portion of the corrected tension data for the flexible cable when it is judged in step (c) that an unexecuted access command is not present;
(f) judging whether an unexecuted access command is present among access commands from the computer;
(g) executing any unexecuted access command; and
(h) generating the remainder of the corrected tension data for the flexible cable when it is judged in step (f) that an unexecuted access command is not present.

6. A magnetic disk drive data storage unit comprising:
a rotary disk data storage medium;
a transducer for reading or writing data from or to the storage medium;
a suspension arm having the transducer attached thereto;
an actuator arm having the suspension arm attached thereto, the actuator arm being driven so that the transducer is located over a predetermined position on the storage medium; and
a flexible cable supported by the actuator arm and connected to a control circuit,
wherein the data storage medium or the control circuit form a computer readable data storage medium for storing a program for executing the method for starting the data storage unit comprising the steps of:
(a) turning on power to the data storage unit;
(b) executing a start operation for the storage unit, comprising (i) executing internal diagnostic program, (ii) rotating the spindle motor and (iii) reading microcode and stored tension data for the flexible cable;
(c) executing any unexecuted access command from the computer; and
(d) executing generation of corrected tension data for the flexible cable, following step (c).

\* \* \* \* \*